(12) United States Patent
Kanaya et al.

(10) Patent No.: US 10,151,370 B2
(45) Date of Patent: Dec. 11, 2018

(54) ELECTROMAGNETIC ACTUATOR, ACTIVE VIBRATION-CONTROL DEVICE AND ACTIVE VIBRATION-DAMPING DEVICE

(71) Applicant: SUMITOMO RIKO COMPANY LIMITED, Komaki-shi, Aichi (JP)

(72) Inventors: Tomohiro Kanaya, Komaki (JP); Kei Okumura, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

(21) Appl. No.: 15/497,622

(22) Filed: Apr. 26, 2017

(65) Prior Publication Data

US 2017/0328441 A1 Nov. 16, 2017

(30) Foreign Application Priority Data

May 13, 2016 (JP) .................................. 2016-097416

(51) Int. Cl.
  *F16F 15/00* (2006.01)
  *F16F 13/26* (2006.01)
  (Continued)

(52) U.S. Cl.
  CPC .......... *F16F 15/005* (2013.01); *B60K 5/1208* (2013.01); *F16F 13/08* (2013.01);
  (Continued)

(58) Field of Classification Search
  CPC .......... F16F 15/05; F16F 15/022; F16F 15/03; F16F 15/073; F16F 15/0275; F16F 15/18;
  (Continued)

(56) References Cited

U.S. PATENT DOCUMENTS 6,145,802 A * 11/2000 Nakagaki ............... F16F 13/264
  248/636
6,565,072 B2 * 5/2003 Goto ...................... F16F 7/1011
  267/140.14
(Continued)

FOREIGN PATENT DOCUMENTS

EP 3124822 A1 * 2/2017 ............ F16F 7/1011
JP 2000-234645 A 8/2000
(Continued)

*Primary Examiner* — Thomas J Williams
(74) *Attorney, Agent, or Firm* — Oliff PLC (57) ABSTRACT

An electromagnetic actuator including: an inner axial member; an outer housing member; a stator and a mover configured to have electromagnetic oscillation force exerted between them, each being securely assembled to different one of the members; and plate springs elastically connecting the members at opposite axial sides thereof, wherein the outer housing member includes an outer tubular member and first and second lid members attached to opposite axial openings thereof, and a first axial side of the outer tubular member has a small-diameter constricted section, and the constricted section has axially inner and outer stepped walls, and the axially inner stepped wall positions a first axial side of the stator or the mover assembled to the outer housing member, while the axially outer stepped wall and the first lid member support a periphery of the corresponding plate spring.

8 Claims, 1 Drawing Sheet

(51) Int. Cl.
*F16F 15/02* (2006.01)
*F16F 13/08* (2006.01)
*B60K 5/12* (2006.01)
*F16F 15/027* (2006.01)
*H02K 33/16* (2006.01)

(52) U.S. Cl.
CPC ............ *F16F 13/26* (2013.01); *F16F 15/022* (2013.01); *F16F 15/0275* (2013.01); *H02K 33/16* (2013.01); *F16F 2222/06* (2013.01)

(58) Field of Classification Search
CPC ........ F16F 2222/06; F16F 13/08; F16F 13/26; F16F 15/005
USPC ....... 267/140.14, 140.15; 248/569, 576, 624, 248/629, 636, 638
See application file for complete search history.

(56) References Cited

U.S. PATENT DOCUMENTS

| | | | |
|---|---|---|---|
| 8,573,569 | B2 | 11/2013 | Hasegawa et al. |
| 8,616,536 | B2 | 12/2013 | Kim et al. |
| 8,919,748 | B2 | 12/2014 | Urayama et al. |
| 2017/0033675 | A1* | 2/2017 | Gastineau .............. F16F 7/1011 |
| 2017/0314632 | A1* | 11/2017 | Kanaya .................. F16F 7/1011 |

FOREIGN PATENT DOCUMENTS

| | | |
|---|---|---|
| JP | 2000-337427 A | 12/2000 |
| JP | 2011-109831 A | 6/2011 |

* cited by examiner

ELECTROMAGNETIC ACTUATOR, ACTIVE VIBRATION-CONTROL DEVICE AND ACTIVE VIBRATION-DAMPING DEVICE

INCORPORATED BY REFERENCE

The disclosure of Japanese Patent Application No. 2016-097416 filed on May 13, 2016 including the specification, drawings and abstract is incorporated herein by reference in its entirety.

BACKGROUND OF THE INVENTION

1. Field of the Invention

The present invention relates to an art concerning an electromagnetic actuator that generates an axial electromagnetic driving force between an inner axial member and an outer tubular member and relates to the electromagnetic actuator and an active vibration-control device and an active vibration-damping device using the same.

2. Description of the Related Art

Generally, for an active vibration-control device or an active vibration-damping device, which is referred as an active type, the electromagnetic actuator is used in order to obtain an oscillation force. The electromagnetic actuator, as disclosed in Japanese Unexamined Patent Publication No. JP-A-2011-109831 for example, has a structure wherein both axial sides of an inner axial member are elastically supported in relation to an outer housing member by plate springs and the inner axial member is assembled to be movable relative to the outer housing member in the axial direction. The electromagnetic force exerted between a stator and a mover acts on the inner axial member and the outer housing member, thereby providing an axial oscillation force.

In the electromagnetic actuator of the conventional structure as disclosed in JP-A-2011-109831 mentioned above, an outer housing metal fitting with a bottomed circular tube shape is used. The plate springs, coil members, and the like are assembled to the outer housing metal fitting as they are superposed from the side of the bottom of the outer housing metal fitting. In the assembly, it is impossible to visually check the bottom of the outer housing metal fitting, so that it is difficult to keep assembly accuracy of the plate springs and the coil members.

Moreover, if the plate springs and the coil members are superposed and assembled to the side of the bottom of the outer housing metal fitting, the electromagnetic actuator tends to suffer from interference of the plate springs in relation to the side of the inner axial member during the oscillation operation. Therefore, a means to resolve the problem is required, e.g., interposition of a separate spacer between the plate spring and the coil member, or use of a unique shape such as a stepped shape for coil-side yoke members as disclosed in JP-A-2011-109831. Thus, the conventional electromagnetic actuator is intricately structured and difficult to manufacture.

SUMMARY OF THE INVENTION

It is therefore one object of the present invention to provide an electromagnetic actuator and the like of novel structure which are able to prevent interference of the plate springs in relation to the side of the inner axial member by a simple structure, while easily securing assembly accuracy of the plate springs and the coil member.

The above and/or optional objects of this invention may be attained according to at least one of the following modes of the invention. The following modes and/or elements employed in each mode of the invention may be adopted at any possible optional combinations.

A first mode of the present invention provides an electromagnetic actuator comprising: an inner axial member; an outer housing member; a stator and a mover configured to have an electromagnetic oscillation force exerted between them, the stator and the mover securely assembled to different members out of the inner axial member and the outer housing member; and plate springs elastically connecting the inner axial member and the outer housing member at opposite axial sides of the inner axial member and the outer housing member, wherein the outer housing member includes an outer tubular member and first and second lid members attached respectively to opposite axial openings of the outer tubular member, and a first axial side part of the outer tubular member has a small-diameter constricted section provided therein, and the constricted section has axially inner and outer stepped walls, and the axially inner stepped wall positions a first axial side part of the stator or the mover which is assembled to the outer housing member, while the axially outer stepped wall and the first lid member support a periphery of a corresponding one of the plate springs.

In the electromagnetic actuator constructed according to this mode, the outer tubular member that opens to the both axial sides is used. The constricted section is provided at the outer tubular member, and the stator or the mover and the plate spring are disposed on opposite axial sides of the constricted section. Therefore, good accuracy of axial positioning is ensured for both the stator or the mover and the plate spring by superposing them on the constricted section of the outer tubular member. The constricted section also keeps the space between the stator or the mover and the plate spring. This makes it possible to avoid interference of the inner axial member and the stator or the mover to the plate spring during the oscillation operation, without requiring a separate spacer or the like.

Moreover, since the plate springs are assembled to the openings of the outer tubular member on the both axial sides, check such as visual check is also enabled with respect to the assembly state of the plate spring. Thus, the assembly of the plate springs on the both axial sides is facilitated, while the assembly accuracy can be improved.

A second mode of the present invention provides the electromagnetic actuator according to the first mode, further comprising a pressing member protruding peripherally inward from a second axial side part of the outer tubular member and positioning a second axial side part of the stator or the mover which is assembled to the outer housing member at a location further axially inside than a corresponding one of the axial openings of the outer tubular member.

In the electromagnetic actuator of the present mode, it is possible to easily keep the axial space between the plate spring assembled to the axial opening of the outer tubular member and the stator or the mover which is disposed further axially inside than the plate spring, using the pressing member. Note that the pressing member can be fixed by fastening the outer peripheral edge of the pressing member between the axial opening of the outer tubular member and the second lid member by clinching or another means, for example. Thus, the stator or the mover can be securely fixed to the outer housing member by being axially clamped between the constricted section of the outer tubular member and the pressing member.

A third mode of the present invention provides the electromagnetic actuator according to the first or second mode, further comprising flat flange parts formed at the opposite axial openings of the outer tubular member so as to face outward, wherein the first and second lid members are fastened by clinching to the respective flange parts, while peripheries of the plate springs are supported by sections of the clinching.

In the electromagnetic actuator of the present mode, it is possible to securely support and assemble the plate springs with a simple structure, using sections where the flange parts of the outer tubular member and the first and second lid members are fastened.

A fourth mode of the present invention provides the electromagnetic actuator according to any one of the first to third modes, wherein the stator is constituted by including a coil member, and the stator is assembled to the outer housing member.

In the electromagnetic actuator of the present mode, by assembling the coil member as the stator to the outer housing member, bending deformation of a powerfeeder to the coil member is avoided, thereby making it possible to easily secure arrangement line. Especially when the outer housing member is securely attached to the other component, deformation of the powerfeeder to the coil member accompanying the oscillation operation is avoided, so that durability and reliability can be improved.

A fifth mode of the present invention provides the electromagnetic actuator according to any one of the first to fourth modes, further comprising an elastic spacer provided in the axially inside stepped wall of the constricted section of the outer tubular member, wherein the stepped wall positions the first axial side part of the stator or the mover via the elastic spacer.

In the electromagnetic actuator of the present mode, dimension variety in the axial fixation part of the stator or the mover due to tolerance of parts can be absorbed by the elastic spacer. In addition to the axial elastic spacer according to this mode, it is also possible to provide a radial elastic spacer in the inner face of the outer tubular member, thereby accommodating assembly error in the axis-perpendicular direction of the stator or the mover which is assembled to the outer tubular member in an insertion state, and improving centering property.

A sixth mode of the present invention provides the electromagnetic actuator according to any one of the first to fifth modes, wherein, in parts where the first and second lid members are attached to the opposite axial openings of the outer tubular member, a tubular clinching piece is provided at a first one of the outer tubular member and a corresponding one of the lid members and the clinching piece is fastened by clinching to a second one of the outer tubular member and the corresponding one of the lid members, and an inner peripheral face of the tubular clinching piece positions a peripheral end of a corresponding one of the plate springs in an axis-perpendicular direction.

In the electromagnetic actuator of the present mode, the outer peripheral face of the plate spring is in contact with the inner peripheral face of the tubular clinching piece. Using this contact action, it is possible to assemble the plate spring to the outer housing member such that the plate spring that is assembled to the section of the clinching is positioned in the axis-perpendicular direction, as easily centered with good accuracy.

A seventh mode of the present invention provides an active vibration-control device comprising: the electromagnetic actuator according to any one of the first to sixth modes, wherein the stator is constituted by including a coil member and assembled to the outer housing member, the mover is constituted by including a permanent magnet and assembled to the inner axial member, the first and second lid members cover opposite axial sides of the outer tubular member so as to form a closed internal space, the inner axial member including the mover is housed within the closed internal space, and an attachment part configured to be attached to a member subject to vibration-damping is provided at the outer tubular member.

An eighth mode of the present invention provides an active vibration-damping device comprising: the electromagnetic actuator according to any one of the first to sixth modes; and a fluid-filled vibration-damping device main unit having a fluid chamber with a non-compressible fluid sealed therein and an oscillation member exerting pressure fluctuation to the fluid chamber, wherein the stator is constituted by including a coil member and assembled to the outer housing member, the mover is constituted by including a permanent magnet and assembled to the inner axial member, the outer housing member is mounted to the fluid-filled vibration-damping device main unit, and an output member is provided integrally with the inner axial member so as to protrude axially outward through the first lid member of the outer housing member and be attached to the oscillation member.

According to the present invention, by using the constricted section of the outer tubular member in the electromagnetic actuator, it is possible to precisely assemble the plate spring and the stator or the mover to the outer housing member, while keeping a predetermined space between the plate spring and the stator or the mover in the axial direction.

BRIEF DESCRIPTION OF THE DRAWINGS

The foregoing and/or other objects, features and advantages of the invention will become more apparent from the following description of a preferred embodiment with reference to the accompanying drawing in which like reference numerals designate like elements and wherein.

DETAILED DESCRIPTION OF PREFERRED EMBODIMENTS

There will be described below the embodiment of the present invention while referring to the drawing.

Figure 1:
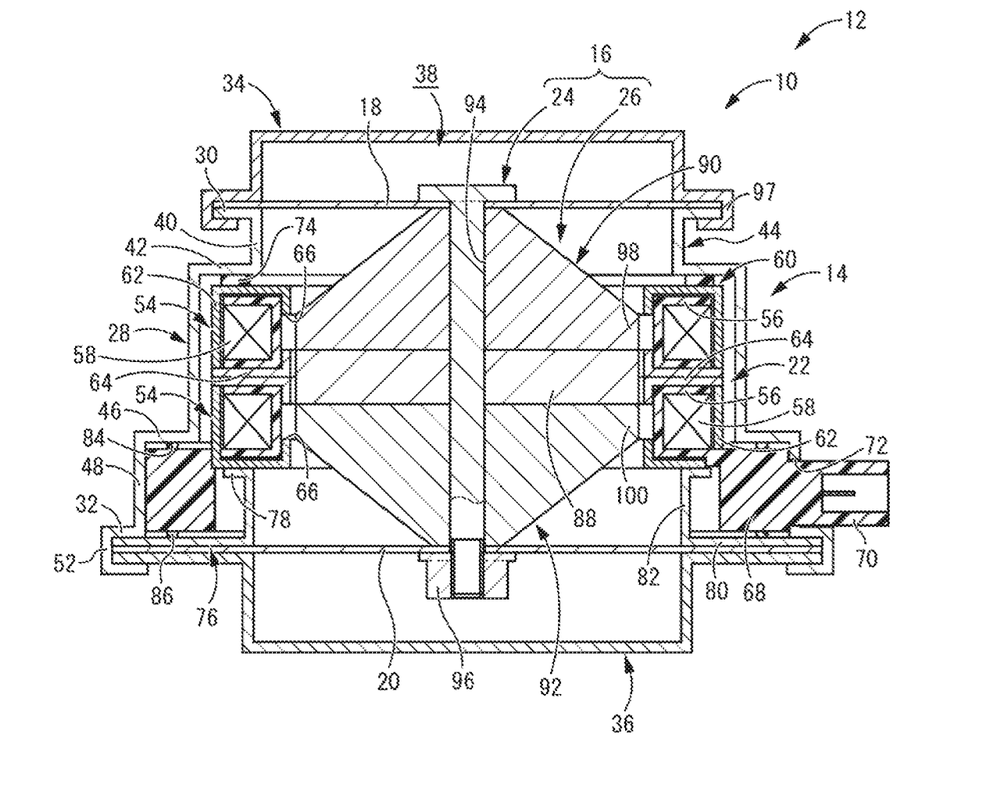
FIG. 1 is a longitudinal cross sectional view showing an active vibration-control device using an electromagnetic actuator as a first embodiment of the present invention.

FIG. 1 shows an automotive active vibration-control device 12 including an electromagnetic actuator 10 as a first embodiment of the present invention. With respect to this active vibration-control device 12, an outer housing member 14 is securely attached to an automotive body or the like, which is a member subject to vibration-damping and the primary vibration system. A mass member 16 is disposed to be housed within the outer housing member 14 while being elastically connected to the outer housing member 14 by plate springs 18, 20 so as to constitute a mass-spring system, which is the secondary vibration system. A stator 22 is attached to the outer housing member 14, while the mass member 16 described above is constituted by including an inner axial member 24 and a mover 26, which is attached to the inner axial member 24. The mover 26 is disposed internally or externally in relation to the stator 22 such that the mover 26 is displaceable relative to the stator 22 in the axial direction. In explanation hereinafter, unless otherwise stated, the up-down direction and the axial direction mean the up-down direction in FIG. 1, which is the direction in which the electromagnetic actuator 10 actuates and the input direction of the vibration to which the active vibration-damping effect by the active vibration-control device 12 is exerted.

More specifically, the outer housing member 14 has an outer tubular member 28 whose shape is a substantially large-diameter circular tube. With the both upper and lower openings of the outer tubular member 28, upper and lower flange parts 30, 32 are integrally formed having a flat shape facing outward and expanding radially outward. A first lid member 34 and a second lid member 36 which have a generally disk shape are superposed to the upper and lower openings of the outer tubular member 28, respectively. The peripheries of these first and second lid members 34, 36 are fixed to the upper and lower openings of the outer tubular member 28, thereby constituting the outer housing member 14 that has a housing area 38 as a closed internal space inside it.

The outer tubular member 28 has a smaller diameter in the axially upper part thereof. At the upper side of the outer tubular member 28, a constricted section 44 that is constituted by a small-diameter tubular part 40, and an axially outside stepped wall and an axially inside stepped wall 42 that expand from both axial sides of the small-diameter tubular part 40 toward the peripheral side.

Especially in the present embodiment, each of the axially outside stepped wall and the axially inside stepped wall 42 has an annular plate shape that expands in the axis-perpendicular direction. The axially outside stepped wall constitutes the flange part 30 which is positioned at the upper end opening of the outer tubular member 28.

The outer tubular member 28 has a larger diameter in the axially lower part thereof. That is, a step 46 is formed to be located in the axially intermediate part of the outer tubular member 28, while a large-diameter tubular part 48 is formed to extend downward from the peripheral end of the step 46. The flange part 32 is formed at the lower end of the large-diameter tubular part 48 and positioned at the lower opening of the outer tubular member 28. With the peripheral end of the flange part 32, a clinching part 52 is integrally formed as a clinching piece in a circular tube shape protruding downward (to the side of the second lid member 36).

The stator 22 is housed within the outer tubular member 28 like this. The stator 22, which has a substantially thick cylindrical shape as a whole, is securely assembled such that it is positioned roughly at the central part in the axial direction of the outer tubular member 28 along the inner face thereof.

In details, the stator 22 includes two coil members 54, 54 which are arranged in an up-down two stage manner. The coil member 54 has a structure wherein an outer yoke 60 is assembled to a coil 58, which includes a bobbin 56 formed of a resin and a conductive metal wire wound around it. Accordingly, the whole shape of the coil member 54 is a generally thick cylinder with a large diameter.

The outer yoke 60, which is formed of a ferromagnet like iron, includes a first yoke 62 that is overlapped with the coil 58 as covering it from the axially outer face to the radially outer face thereof, and a second yoke 64 that is overlapped with the coil 58 as covering the axially inner face thereof.

All radially inner ends of the first yoke 62 and the second yoke 64 that are overlapped with the respective axial faces of the coil 58 extend in the axial direction from the respective up-down sides with their own prescribed lengths as covering the inner face of the coil 58. The ends of the first yoke 62 and the second yoke 64, which come close to each other from upside and downside in the axial direction on the inner face of the coil 58, face each other while being spaced apart therefrom with a prescribed distance in the axial direction.

Thus, around each of the upper and lower coils 58, 58, the outer yoke 60 including the first and second yokes 62, 64 forms a magnetic path, which guides magnetic flux generated through energization to the coils 58, 58. On this magnetic path, magnetic gaps 66, 66 are formed on the side of the inner faces of the coils 58, 58, between the opposite faces of the first yoke 62 and the second yoke 64 in the axial direction. These magnetic gaps 66, 66 expand continuously along the entire circumference in the circumferential direction with a substantially constant space.

Owing to power feed from the outside to the coils 58, 58, the magnetic flux is generated around the coils 58, 58 and guided by the magnetic path constituted by the outer yokes 60, 60. As a result, the magnetic poles are formed on both axial sides of the magnetic gaps 66, 66.

In this embodiment, for the coil 58 of the upper coil member 54 and the coil 58 of the lower coil member 54, the wires are wound around the bobbins 56 in the adverse directions relative to each other, thereby generating magnetic flux in the adverse directions through the energization. The coils 58, 58 of the upper and lower coil members 54, 54 may be constituted by mutually continuous wires.

Besides, in this embodiment, the upper and lower coil members 54, 54 are substantially symmetrical and integrally formed having the bobbins 56, 56 of integral structure. With the lower bobbin 56, a power feed spacer 68 is integrally formed so as to protrude radially outward at the lower side. This power feed spacer 68 has an annular shape with a large diameter. At a part on the circumference of the power feed spacer 68, a connector part 70 is formed including a terminal metal fitting for supplying the upper and lower coils 58, 58 with electricity from the outside.

The stator 22 including these coil members 54, 54 is inserted in the outer tubular member 28 from below and assembled thereto. The coil members 54, 54 are disposed in the axially intermediate part of the outer tubular member 28, while the power feed spacer 68 is disposed in the large-diameter tubular part 48 of the outer tubular member 28.

The upper end face of the upper coil member 54 is overlapped with the axially inside stepped wall 42 of the constricted section 44 of the outer tubular member 28. As a result, the axial position of the stator 22 is set within the outer tubular member 28.

The power feed spacer 68 is overlapped on the step 46 of the outer tubular member 28. Moreover, the connector part 70 of the power feed spacer 68 is inserted through an insertion hole 72 formed through the large-diameter tubular part 48, so that the tip part of the connector part 70 protrudes on the outer peripheral face of the outer tubular member 28.

Furthermore, a rubber layer with a prescribed thickness is formed in an adhered state on the inner face of the outer tubular member 28, so that an axial elastic spacer 74 is formed on the lower face of the axially inside stepped wall 42 of the constricted section 44. Note that in the present embodiment, the elastic spacer 74 in a ring shape is provided. Besides, it is possible to form a radial elastic spacer on the inner face of the axially intermediate part of the outer tubular member 28, as well. The upper side part of the stator 22 is abutted against the axially inside stepped wall 42 of the constricted section 44 via the axial elastic spacer 74, whereby it is positioned in the axial direction. Moreover, the stator 22 may be abutted to the inner face of the outer tubular member 28 via the radial elastic spacer and positioned in the radial direction.

Additionally, a pressing member 76 is fitted in and assembled to the outer tubular member 28 via the lower opening of the outer tubular member 28. The whole shape of the pressing member 76 is a stepped cylinder having the axial length approximately equal to that of the large-diameter tubular part 48 of the outer tubular member 28. In the pressing member 76, the part located at the axially upper end is an annular pressing plate 78, while the part located at the axially lower end is an annular fixing plate 80. Besides, these pressing plate 78 and fixing plate 80 are connected to each other at their own radially inner ends by a tubular portion 82.

The fixing plate 80 of the pressing member 76 is superposed on the lower flange part 32 of the outer tubular member 28, and fastened to the flange part 32 together with the periphery of the second lid member 36 by clinching using the clinching part 52 of the outer tubular member 28. The pressing plate 78 is superposed on the axially lower face of the stator 22 including the coil members 54, 54. Consequently, the stator 22 is securely assembled to the outer housing member 14 as the stator 22 is clamped between the axially inside stepped wall 42 of the constricted section 44 and the pressing plate 78, in the axial direction of the outer housing member 14.

In this way, the pressing member 76 is assembled to the lower opening of the outer tubular member 28, so that the pressing member 76 protrudes further peripherally inward than the outer tubular member 28. By the pressing plate 78 of this pressing member 76, the lower side part of the stator 22 is axially positioned at a location further axially inside than the lower opening of the outer tubular member 28.

The power feed spacer 68 is disposed externally about the pressing member 76. The power feed spacer 68 is clamped between the pressing member 76 and the step 46 of the outer tubular member 28 and the large-diameter tubular part 48, whereby the base end side part of the connector part 70 that protrudes outside is supported by the outer housing member 14.

The dimension error between the faces of the stepped wall 42 and the pressing plate 78 that axially clamp and support the stator 22 or the like is accommodated by the elastic spacer 74 provided on the stepped wall 42, so that a stable clamping force for the stator 22 can be exhibited. The radially outer face of the stator 22 may be also abutted and positioned in relation to the inner face of the outer tubular member 28 via an elastic spacer. By so doing, it becomes possible as well to assemble the stator 22 in a favorably centered state to the outer housing member 14, while absorbing the dimensional error of the components.

Especially in this embodiment, additionally, an annular elastic spacer 84 is formed on the inner face of the step 46 of the outer tubular member 28 in an adhered state, while an annular elastic spacer 86 is formed on the upper face of the fixing plate 80 of the pressing member 76 in an adhered state. The power feed spacer 68 is clamped between the step 46 of the outer tubular member 28 and the fixing plate 80 of the pressing member 76 via the elastic spacers 84, 86 in the axial direction, thereby keeping sealing of the gaps between the power feed spacer 68 and the both components.

The axial position where the pressing member 76 is assembled to the outer tubular member 28 is determined by the flange part 32. Therefore, the part where the power feed spacer 68 is clamped is out of the action path of the axial clamping force for the stator 22. Consequently, it is possible to sufficiently secure the axial clamping fixation force for the stator 22, while suitably setting retaining force, sealing performance and the like in the assembly part of the power feed spacer 68.

Meanwhile, the inner axial member 24 has a rod shape extending straight in the up-down direction, on the central axis of the outer housing member 14, or co-axially with the same. The mover 26, which is disposed in an area surrounded by the stator 22 assembled to the outer housing member 14 (the closed internal space 38), is securely assembled to the inner axial member 24. In the present embodiment, the length dimension of the inner axial member 24 is shorter than the axial dimension between the faces of the first and second lid members 34, 36 which face each other, so that the whole inner axial member 24 is housed within the housing area (closed internal space) 38.

The mover 26 has an armature in a structure wherein an upper yoke 90 and a lower yoke 92 as inner yokes are superposed on the respective upper-lower sides of a permanent magnet 88. In these permanent magnet 88 and upper and lower yokes 90, 92, a through hole 94 is formed extending on the central axes thereof in the axial direction. In the through hole 94, the inner axial member 24 is inserted. By a fixation nut 96 being threaded onto the inner axial member 24, a fastening force is exerted on the permanent magnet 88 and the upper and lower yokes 90, 92 in the overlap direction, thereby fixing them to the inner axial member 24.

On the axial end faces of the upper and lower yokes 90, 92, the plate springs 18, 20 are superposed. The inner axial member 24 penetrates the plate springs 18, 20 on the central axes thereof. As a result, the central portions of the plate springs 18, 20 are superposed and fixed respectively to the upper and lower yokes 90, 92.

The peripheries of the upper and lower plate springs 18, 20 are fixed to the outer housing member 14, whereby the inner axial member 24 having the mover 26 is elastically supported by the outer housing member 14 via the plate springs 18, 20 at the proximity of each axial end of the inner axial member 24. In the plate springs 18, 20, a plurality of through windows are formed extending in a spiral form. The through windows secure large spring rigidity in the axis-perpendicular direction and adjust spring characteristics in the axial direction.

Specifically, the peripheries of the upper plate spring 18 and the first lid member 34 are superposed on the flange part 30, which is provided at the upper opening of the outer tubular member 28, and then a clinching part 97 described later and provided at the peripheral end of the first lid member 34 fastens them by clinching. By so doing, the plate spring 18 is fixed to the outer housing member 14. On the other hand, the peripheries of the lower plate spring 20 and the second lid member 36 are superposed on the flange part 32, which is provided at the lower opening of the outer tubular member 28, and then the clinching part 52 provided at the peripheral end of the flange part 32 fastens them by clinching. By so doing, the plate spring 20 is fixed to the outer housing member 14.

The permanent magnet 88 constituting this mover 26 has a substantially annular plate shape with flat upper and lower surfaces expanding in the axis-perpendicular direction. The permanent magnet 88 is magnetized in the axial direction, thereby forming N and S magnetic poles on the respective upper and lower surfaces thereof. Note that, as the permanent magnet 88, although a ferrite based magnet and an alnico based magnet can be adopted, a rare-earth cobalt based magnet is preferably adopted.

The upper and lower yokes 90, 92 are formed of a ferromagnet like iron, and it is possible to use the same material for each other. For the upper and lower yokes 90, 92, the overlap surfaces with the permanent magnet 88 have a flat surface shape corresponding to the permanent magnet 88, whereby the upper and lower yokes 90, 92 are superposed on the permanent magnet 88 with wide surfaces generally in intimate contact with it.

With respect to the upper and lower yokes 90, 92, the radially outer surface has a shape whose diameter gets gradually smaller as it goes to the axial outside. This eliminates interference with the plate springs 18, 20 when the upper and lower yokes 90, 92 are displaced in the axial direction. For the first and second lid members 34, 36 assembled to the both axial sides of the outer tubular member 28 to cover the upper and lower plate springs 18, 20 from outside, the central portion takes the form of an inverted bowl or a bowl that swells axially outward. This form avoids interference of the upper and lower plate springs 18, 20, while allowing axial displacement of the mover 26 within the outer housing member 14. With the peripheral end of the first lid member 34, the clinching part 97 as a clinching piece in a circular tube shape is integrally formed protruding downward (to the side of the outer tubular member 28). The inner face of each of the lid members 34, 36 may be covered with a thin rubber layer. For example, a stopper rubber can be formed at the central portion of the lid member, so as to limit the axial displacement of the inner axial member 24 in cushioned fashion.

In the upper and lower yokes 90, 92, annular outermost peripheral parts 98, 100 with the largest diameter are provided in the proximity of the ends on the side of overlap with the permanent magnet 88. Especially in this embodiment, the outermost peripheral parts 98, 100 are formed to have the outer diameter dimension roughly equal to that of the permanent magnet 88. By the magnetic poles set at the both axial end faces of this permanent magnet 88, the radially outer surfaces of the outermost peripheral parts 98, 100 of the upper and lower yokes 90, 92 are provided with the respective one of N and S magnetic poles.

The axial thickness dimension of the permanent magnet 88 is nearly equal to the axial distance between the upper and lower magnetic gaps 66, 66 in the stator 22. The radially outer surfaces of the outermost peripheral parts 98, 100 of the upper and lower yokes 90, 92 where the magnetic poles are formed are disposed to face the magnetic gaps 66, 66 with a radial space in between.

By so doing, when a magnetic field is generated for the upper and lower magnetic gaps 66, 66 through the energization to the coils 58, 58 of the stator 22, an axial magnetic attractive force is exerted on the outermost peripheral part 98 (100) of one of the upper and lower yokes 90 (92), while an axial magnetic repulsive force is exerted on the outermost peripheral part 100 (98) of the other of the upper and lower yokes 92 (90). Based on the effect of these magnetic forces, a driving force to either axial side acts on the mover 26 depending on the energization direction to the coils 58, 58 of the stator 22. Control of interval and direction of the energization to the coils 58, 58 makes it possible to exert an axial oscillation force on the mover 26, and hence the inner axial member 24 by prescribed periods.

In this embodiment, the elasticity of the upper and lower plate springs 18, 20 retains the mover 26 in the initial axial position relative to the stator 22 such that the mover 26 rapidly comes back to the initial position when the driving force by the power supply from the outside is cancelled.

The actuator 10 of this structure constitutes the active vibration-control device, by the outer tubular member 28 of the outer housing member 14 being securely attached and mounted to a member subject to vibration-damping of the primary vibration system, via a not-shown attachment part or an attachment part constituted by a portion of the outer tubular member 28. In this attachment state, the power feed to the coils 58, 58 of the stator 22 is controlled depending on the axial vibration subject to damping. Thus, the mover 26 and the inner axial member 24 constituting the secondary vibration system are oscillated in the axial direction relative to the stator 22 and the outer housing member 14 so as to obtain the target vibration-damping effect.

Here in the actuator 10 of this embodiment, the plate springs 18, 20 are assembled to the outer tubular member 28 that opens the opposite axial sides, from the both axial sides thereof, and fastened by clinching to the outer tubular member 28. Therefore, for example compared to a case for which the outer housing metal fitting of a bottomed circular tube shape disclosed in JP-A-2011-109831 is used, the assembly work of each component is easier and check such as visual check of the assembly state for each component is easier as well.

At the assembly parts on the both axial sides of the outer tubular member 28 where the first and second lid members 34, 36 are assembled, the upper and lower plate springs 18, 20 can be positioned using the clinching parts 52, 97 as the clinching pieces. That is, the inner peripheral faces of the clinching parts 52, 97 in a circular tube shape before clinching process can be used as guide faces to set the both lid members 34, 36 while easily centering them. After the both lid members 34, 36 are assembled in a centered state, the clinching parts 52, 97 are subjected to the clinching process. By so doing, the upper and lower plate springs 18, 20 can be fixed to the outer housing member 14 with good positioning accuracy in the axis-perpendicular direction.

Moreover, for the actuator 10 of this embodiment, by taking advantage of the constricted section 44 provided at the upper part of the outer tubular member 28, it is possible to precisely position the stator 22 in relation to the one axial side by a simple structure without requiring a special other part. In addition to that, it is also possible to set a predetermined space between the stator 22 and the plate spring 18 on the axial side.

Especially in this embodiment, the pressing member 76 is assembled to the lower part of the outer tubular member 28. Owing to this, on the other axial side of the stator 22, it is possible to stably position the stator 22 while keeping a predetermined space between the stator 22 and the plate spring 20. Additionally, it is possible to ensure a space for disposing and supporting the power feed spacer 68 between the outer tubular member 28 and the pressing member 76 in the radial direction, thereby stably retaining the connector part 70 by the outer housing member 14.

There has been described the embodiment of the present invention. However, the present invention is not limited by the specific description of the embodiment. For example, the coil members constituting the stator are not limited to the two coil members overlapped in an up-down two stage manner. That is, it is also possible to provide only one coil member, or to provide three or more coil members overlapped in a multiple stage manner in the axial direction. Besides, with respect to the upper and lower coil members 54, 54 in the aforesaid embodiment, the coils 58, 58 wound in the adverse directions relative to each other are adopted, but it is also possible to use upper and lower coils wound in the same direction.

Regarding the mover as well, it is possible to adopt various structures to generate an axial driving force using the magnetic effect caused through the energization to the coil members, depending on the employed structure of the stator. For example, it is also possible to set magnetic poles in multiple steps by overlapping the permanent magnets and the yokes mutually in multiple steps. Additionally, the permanent magnet is not indispensable, and it is possible as well to use a structure for which the mover formed of a ferromagnetic material is adopted and an axial driving force is generated using a magnetic absorptive force in relation to the magnetic poles formed in the coil members.

In the aforementioned embodiment, the coil members 54, 54 are disposed on the side of the stator 22, while the permanent magnet 88 is disposed on the side of the mover 26. To the contrary, it is also possible to dispose the coil members on the side of the mover, while disposing the permanent magnet on the side of the stator. This structure can be realized for example by using the features shown in Japanese Unexamined Patent Publication No. JP-A-2000-234645 (incorporated herein by reference).

Moreover, in the aforesaid embodiment, the mover 26 (the permanent magnet 88 and the upper and lower yokes 90, 92) and the inner axial member 24 are used as the mass member 16 of the secondary vibration system. However, as U.S. Pat. No. 8,573,569 (incorporated herein by reference) discloses, for example, it is also possible to have the inner axial member protrude axially outside and attach an additional mass to the protruding tip of the inner axial member. Furthermore, as the same document discloses, it is possible as well to use an additional spring that elastically connects the inner axial member and the outer tubular member and is constituted by a rubber elastic body etc., in addition to the upper and lower plate springs.

In the above-described embodiment, the electromagnetic actuator 10 structured according to the present invention being applied to the active vibration-control device 12 is shown as an example. However, the electromagnetic actuator 10 can be applied also to an active vibration-damping device used as an engine mount, a body mount, or the like, for example. Specifically, for example, the above-mentioned electromagnetic actuator 10 can be adopted as an actuator in a well-known active vibration-damping device disclosed in Japanese Unexamined Patent Publication No. JP-A-2000-337427 (incorporated herein by reference). Specifically, the fluid-filled vibration-damping device main unit includes a fluid chamber with a non-compressible fluid or liquid is sealed therein, and a portion of the wall of this fluid chamber is constituted by an oscillation member that exerts pressure fluctuation. Hence, in the electromagnetic actuator 10 according to the above-described embodiment, it is possible to fix the outer housing member 14 to an attachment member of the fluid-filled vibration-damping device so as to apply the axial oscillation force that is exerted to the inner axial member 24 to the oscillation member of the fluid-filled vibration-damping device, for example. More specifically, in the electromagnetic actuator 10 according to the above-described embodiment, it is possible to use an output member that is provided integrally with the inner axial member 24 to extend in the axial direction, for example. It is possible to have this output member protrude axially outward through the first lid member 34 of the outer housing member 14, thereby bringing the driving force out. This makes it possible to oscillate the oscillation member of the fluid-filled vibration-damping device main unit.

In addition to them all, other embodiments including various changes, amendments, modifications and the like on the basis of the knowledge of the skilled person, which are not recited one by one, can be used to realize the present invention. As long as these embodiments do not deviate from the concept of this invention, they are all included in the range of the present invention.

What is claimed is:

1. An electromagnetic actuator comprising:
   an inner axial member;
   an outer housing member;
   a stator and a mover configured to have an electromagnetic oscillation force exerted between them, the stator and the mover securely assembled to different members out of the inner axial member and the outer housing member; and
   plate springs elastically connecting the inner axial member and the outer housing member at opposite axial sides of the inner axial member and the outer housing member, wherein
   the outer housing member includes an outer tubular member and first and second lid members attached respectively to opposite axial openings of the outer tubular member, and a first axial side part of the outer tubular member has a small-diameter tubular constricted section extending axially and provided therein, and the constricted section has axially inner and outer stepped walls, and the axially inner stepped wall positions a first axial side part of the stator or the mover which is assembled to the outer housing member, while the axially outer stepped wall and the first lid member support a periphery of a corresponding one of the plate springs, such that a space is provided by the constricted section between the stator or the mover and one of the plate springs provided on the first axial side part of the outer tubular member.

2. The electromagnetic actuator according to claim 1, further comprising a pressing member protruding peripherally inward from a second axial side part of the outer tubular member and positioning a second axial side part of the stator or the mover which is assembled to the outer housing member at a location further axially inside than a corresponding one of the axial openings of the outer tubular member.

3. The electromagnetic actuator according to claim 1, wherein the stator is constituted by including a coil member, and the stator is assembled to the outer housing member.

4. An electromagnetic actuator comprising:
   an inner axial member;
   an outer housing member;
   a stator and a mover configured to have an electromagnetic oscillation force exerted between them, the stator and the mover securely assembled to different members out of the inner axial member and the outer housing member; and
   plate springs elastically connecting the inner axial member and the outer housing member at opposite axial sides of the inner axial member and the outer housing member, wherein
   the outer housing member includes an outer tubular member and first and second lid members attached respectively to opposite axial openings of the outer tubular member, and a first axial side part of the outer tubular member has a small-diameter constricted section provided therein, and the constricted section has axially inner and outer stepped walls, and the axially inner stepped wall positions a first axial side part of the stator or the mover which is assembled to the outer housing member, while the axially outer stepped wall and the first lid member support a periphery of a corresponding one of the plate springs, and the electromagnetic actuator further comprises flat flange parts formed at the opposite axial openings of the outer tubular member so as to face outward, wherein the first and second lid members are fastened by clinching to the respective flange parts, while peripheries of the plate springs are supported by sections of the clinching.

5. An electromagnetic actuator comprising:
an inner axial member;
an outer housing member;
a stator and a mover configured to have an electromagnetic oscillation force exerted between them, the stator and the mover securely assembled to different members out of the inner axial member and the outer housing member; and
plate springs elastically connecting the inner axial member and the outer housing member at opposite axial sides of the inner axial member and the outer housing member, wherein
the outer housing member includes an outer tubular member and first and second lid members attached respectively to opposite axial openings of the outer tubular member, and a first axial side part of the outer tubular member has a small-diameter constricted section provided therein, and the constricted section has axially inner and outer stepped walls, and the axially inner stepped wall positions a first axial side part of the stator or the mover which is assembled to the outer housing member, while the axially outer stepped wall and the first lid member support a periphery of a corresponding one of the plate springs, and
the electromagnetic actuator further comprises an elastic spacer provided in the axially inside stepped wall of the constricted section of the outer tubular member, wherein the stepped wall positions the first axial side part of the stator or the mover via the elastic spacer.

6. An electromagnetic actuator comprising:
an inner axial member;
an outer housing member;
a stator and a mover configured to have an electromagnetic oscillation force exerted between them, the stator and the mover securely assembled to different members out of the inner axial member and the outer housing member; and
plate springs elastically connecting the inner axial member and the outer housing member at opposite axial sides of the inner axial member and the outer housing member, wherein
the outer housing member includes an outer tubular member and first and second lid members attached respectively to opposite axial openings of the outer tubular member, and a first axial side part of the outer tubular member has a small-diameter constricted section provided therein, and the constricted section has axially inner and outer stepped walls, and the axially inner stepped wall positions a first axial side part of the stator or the mover which is assembled to the outer housing member, while the axially outer stepped wall and the first lid member support a periphery of a corresponding one of the plate springs, and
in parts where the first and second lid members are attached to the opposite axial openings of the outer tubular member, a tubular clinching piece is provided at a first one of the outer tubular member and a corresponding one of the lid members and the clinching piece is fastened by clinching to a second one of the outer tubular member and the corresponding one of the lid members, and an inner peripheral face of the tubular clinching piece positions a peripheral end of a corresponding one of the plate springs in an axis-perpendicular direction.

7. An active vibration-control device comprising:
an electromagnetic actuator that comprises
an inner axial member,
an outer housing member,
a stator and a mover configured to have an electromagnetic oscillation force exerted between them, the stator and the mover securely assembled to different members out of the inner axial member and the outer housing member, and
plate springs elastically connecting the inner axial member and the outer housing member at opposite axial sides of the inner axial member and the outer housing member, wherein the outer housing member includes an outer tubular member and first and second lid members attached respectively to opposite axial openings of the outer tubular member, and a first axial side part of the outer tubular member has a small-diameter constricted section provided therein, and the constricted section has axially inner and outer stepped walls, and the axially inner stepped wall positions a first axial side part of the stator or the mover which is assembled to the outer housing member, while the axially outer stepped wall and the first lid member support a periphery of a corresponding one of the plate springs, wherein
the stator is constituted by including a coil member and assembled to the outer housing member,
the mover is constituted by including a permanent magnet and assembled to the inner axial member,
the first and second lid members cover opposite axial sides of the outer tubular member so as to form a closed internal space,
the inner axial member including the mover is housed within the closed internal space, and
an attachment part configured to be attached to a member subject to vibration-damping is provided at the outer tubular member.

8. An active vibration-damping device comprising:
an electromagnetic actuator that comprises
an inner axial member,
an outer housing member,
a stator and a mover configured to have an electromagnetic oscillation force exerted between them, the stator and the mover securely assembled to different members out of the inner axial member and the outer housing member, and
plate springs elastically connecting the inner axial member and the outer housing member at opposite axial sides of the inner axial member and the outer housing member, wherein the outer housing member includes an outer tubular member and first and second lid members attached respectively to opposite axial openings of the outer tubular member, and a first axial side part of the outer tubular member has a small-diameter constricted section provided therein, and the constricted section has axially inner and outer stepped walls, and the axially inner stepped wall positions a first axial side part of the stator or the mover which is assembled to the outer housing member, while the axially outer stepped wall and the first lid member support a periphery of a corresponding one of the plate springs; and a fluid-filled vibration-damping device main unit having a fluid chamber with a non-compressible fluid sealed therein and an oscillation member exerting pressure fluctuation to the fluid chamber, wherein the stator is constituted by including a coil member and assembled to the outer housing member, the mover is constituted by including a permanent magnet and assembled to the inner axial member, the outer housing member is mounted to the fluid-filled vibration-damping device main unit, and an output member is provided integrally with the inner axial member so as to protrude axially outward through the first lid member of the outer housing member and be attached to the oscillation member.

* * * * *

UNITED STATES PATENT AND TRADEMARK OFFICE
CERTIFICATE OF CORRECTION

PATENT NO. : 10,151,370 B2  
APPLICATION NO. : 15/497622  
DATED : December 11, 2018  
INVENTOR(S) : Tomohiro Kanaya and Kei Okumura Page 1 of 1

It is certified that error appears in the above-identified patent and that said Letters Patent is hereby corrected as shown below:

On the Title Page (72) Inventors should read:
Tomohiro KANAYA, Komaki (JP); Kei OKUMURA, Komaki (JP); Takaaki SHIMIZU, Tokyo (JP); Yasunori KOBAYASHI, Tokyo (JP)

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*